June 21, 1949.　　　　　R. R. LOBOSCO　　　　　2,473,601
GAS SHIELDED DIRECT CURRENT ARC WELDING
Filed June 8, 1946
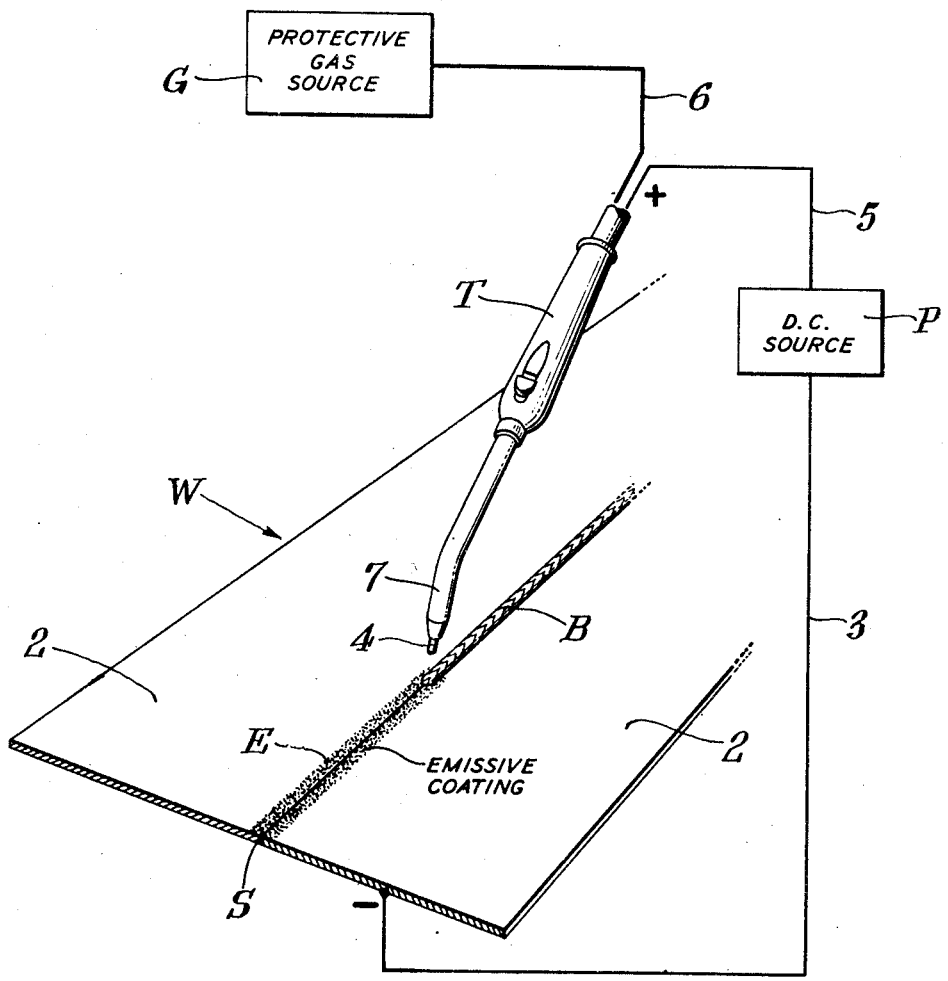
INVENTOR
ROSCOE R. LOBOSCO
BY
ATTORNEY Patented June 21, 1949

2,473,601

UNITED STATES PATENT OFFICE 2,473,601

GAS SHIELDED DIRECT-CURRENT ARC WELDING

Roscoe E. Lobosco, Elizabeth, N. J., assignor to The Linde Air Products Company, a corporation of Ohio Application June 8, 1946, Serial No. 675,351

3 Claims. (Cl. 219—10)

This invention relates to gas shielded, direct current arc welding and more particularly to reverse polarity refractory electrode inert gas-shielded arc welding.

In the inert gas-shielded welding of sheet aluminum and magnesium, for example, it has been found that the reverse polarity connection, i. e. the connection in which the electrode is positive and the work is negative, produces the best welds. However, the very uniform welding conditions which are highly desirable, particularly in machine welding, are not always obtained with such connection. For example, at times the arc tends to be "wild" and wanders and/or scatters over the work surface instead of concentrating along the line of weld, and in some cases the width of the bead and the penetration are not uniform, and in still other cases, particularly when high currents are being used, the welding puddle is highly agitated, producing an irregular bead and sometimes a poor weld. Other disadvantages and difficulties are noted in the article: "Characteristics of welding arcs on aluminum in atmospheres of helium and argon" in the October 1944 issue of The Welding Journal Research Supplement.

Therefore, the main object of this invention is to provide a simple and inexpensive solution to this problem of non-uniformity which is especially well adapted for reverse polarity, direct current, arc welding in a protective atmosphere of gas, such as argon, or helium, or mixture of argon with helium, which is chemically inert with respect to the work and the electrode. It is a further object of this invention to provide a means which will make unnecessary the very thorough removal of surface oxides from the weld area in material such as stainless steel, aluminum and magnesium.

According to the invention, such problem is solved by the application of a very thin coating or film of a suitable electron emissive material to the surface of the metal to be welded, in the area to be welded, prior to the welding operation. Such emissive material preferably is one which emits electrons copiously when heated, for example, one of the compounds or a mixture of compounds of the alkaline earth metals, such as calcium, barium, strontium or rare earth metal, such as cerium, or thorium.

One method of applying the emissive material is to suspend the finely ground emissive material in alcohol or other suitable vehicle, and to paint or spray this suspension on and along the portions of work surface to be welded to form a very thin film. However, it can be applied in any convenient form—solid, liquid, or vapor, i. e. by suitably heating the material. It has been found that when it is applied in the form of a liquid suspension, the finer the material is ground the better its performance.

The use of the emissive material in the manner described produces a quiet, steady arc and a weld having uniform width and penetration. The weld puddle is free from agitation, and as a result any surface oxides on the metal to be welded float to the edge of the bead on the puddle surface. For this reason surface cleaning of the work can often be dispensed with, even with such metals as aluminum. With the conventional means of welding, the welding zone on the work such as aluminum must be carefully cleaned before welding because the agitation and swirling in the weld puddle tend to entrap the surface oxides in the weld metal and thus produce an unsatisfactory weld.

With a straight polarity arc, the greater part of the heat is liberated in the work, but with a reverse polarity arc, the greater part of the heat is liberated at the electrode and the work tends to run cooler than when a straight polarity arc is used. Generally speaking, therefore, a straight polarity arc provides too much heat to the work for any use but welding. A reverse polarity arc cannot be used for brazing and certain other processes requiring a less intense work surface temperature than is provided by a straight polarity arc, because the arc tends to wander or scatter and is difficult to control. For this reason a gas welding flame has generally been used for such applications. However, if an emissive coating is used on the work surface a relatively long, quiet, steady, reverse polarity arc is produced, especially at very low welding current values, which is ideal for many applications such as brazing, as well as for welding thin sheets of normally difficult-to-weld metals.

The drawing is a perspective view of a butt welding set-up exemplifying the invention.

The work W, which consists of sheets 2, 2 of metal such as aluminum arranged in edge-to-edge relation to provide a seam S, is connected to the negative side of a direct current source P by a conductor 3. The positive side of the source P is connected to a refractory electrode 4 of a torch T by a conductor 5. An electron emissive coating E is then applied to the work surface along the zone to be welded. Very finely ground barium carbonate, suspended in alcohol and applied by means of a sprayer has been found to be quite suitable.

The torch is supplied with inert gas, such as argon or helium, from a protective gas source G through a suitable gas conduit 6. The gas is discharged from the nozzle 7 of the torch T so as to envelope the working end of the electrode 4 and the arc as well as the molten weld metal formed between such electrode and the work during the welding operation.

A rod of filler metal may be fed into the welding zone as the welding progresses along the seam S or the filler metal can be supplied by clamping a strip of metal between the abutting edges to be welded.

The seam S is progressively fused from one end to the other, by establishing an arc between the electrode 4 and the work W at one end of the seam, and moving the electrode in the direction of the seam in constantly spaced relation to the work. This results in a weld or bead B, uniting the sheets 2.

The use of an electron emissive material, according to the invention, produces an extremely non-turbulent and fluid puddle of molten metal, which causes oxides and other undesirable inclusions to float to the surface, remarkably improving the resulting weld compared to the prior art. The invention is very satisfactory in the "Heliarc" welding of sheets of metal, such as stainless steel, aluminum, bronze, brass, copper, magnesium, and similar hard-to-weld alloys. High-frequency current to stabilize the welding action may be superimposed on the direct current welding arc without departing from the invention.

What is claimed is:

1. The method of welding metal by the electric arc process which comprises thinly coating the surface of the metal along the zone to be welded with a very thin film of material that is highly emissive of electrons when heated, such film being applied prior to the application of the arc, and fusing the metal by a direct current welding arc maintained between the metal and a refractory electrode in a protective atmosphere of gas which is chemically inert with respect thereto, the polarity of the metal being negative and that of the electrode positive.

2. In reverse polarity direct current inert gas shielded arc welding of a normally difficult-to-weld metal selected from the group consisting of aluminum, stainless steel, magnesium, bronze, brass, and copper, from which surface oxides must be very thoroughly removed prior to the welding operation, which welding is subject to undesirable arc wandering and wildness with respect to the line of weld, the improved process which comprises juxtaposing the metal parts composed of the selected metal to be welded to provide a welding line, depositing on the exposed surfaces of such juxtaposed parts adjacent the line of weld, prior to the welding operation, a very thin film of electron emissive material containing at least one of the compounds of the class consisting of calcium, barium, strontium, cerium, and thorium, which emits electrons copiously when heated, applying a direct current welding potential between such film-covered parts of the work and an uncoated tungsten electrode so that the work is negative with respect to the electrode, discharging a stream of gas containing inert gas of the class consisting of argon and helium toward said parts of the work from a nozzle surrounding said electrode, starting a welding current arc between the electrode and work so as to fuse the parts at the starting point on the line of weld, and advancing the electrode and stream of gas progressively along such line to fuse the parts together under the gas, the electron emissive coating on the work insuring a quiet steady arc which does not deviate from the welding line and results in a weld having uniform width and penetration.

3. In reverse polarity direct current inert gas shielded arc welding of aluminum with a tungsten electrode, which welding is subject to undesirable arc wandering and wildness with respect to the line of weld, the improved process which comprises juxtaposing the aluminum parts to be welded to provide a welding line, depositing on the exposed surface of the metal to be welded, prior to the welding operation, alcohol containing suspended particles of barium carbonate powder, which alcohol quickly evaporates after being deposited on the work leaving a very thin electron emisive film of dry barium carbonate powder on both sides of the exposed work surface adjacent the line of weld, applying a direct current welding potential between such work and an uncoated tungsten electrode so that the work is negative with respect to the electrode, discharging a stream of argon gas toward the work from a nozzle surrounding said electrode, starting a welding current arc between the electrode and work so as to fuse the parts at the starting point on the line of weld, and advancing the electrode and stream of argon progressively along such line to fuse the parts together under the argon gas, the electron emissive coating on the work insuring a quiet steady arc which does not deviate from the welding line and results in a weld having uniform width and penetration.

ROSCOE R. LOBOSCO.

REFERENCES CITED

The following references are of record in the file of this patent:

UNITED STATES PATENTS

| Number | Name | Date |
|---|---|---|
| 1,281,796 | Ladoff | Oct. 15, 1918 |
| 1,294,250 | Elliott | Feb. 11, 1919 |
| 1,749,765 | Hendrickson | Mar. 11, 1930 |
| 1,783,013 | Green | Nov. 25, 1930 |
| 1,812,103 | MacRae | June 30, 1931 |
| 1,870,003 | Elsey et al. | Aug. 2, 1932 |
| 1,977,278 | Judy | Oct. 16, 1934 |
| 2,258,675 | Cohn | Oct. 14, 1941 |
| 2,362,510 | Stutsman | Nov. 14, 1944 |